(12) United States Patent
Ruiz

(10) Patent No.: US 7,380,645 B1
(45) Date of Patent: Jun. 3, 2008

(54) AERODYNAMIC STANDOFFS TO AIR COOL DISC TYPE AUTO BRAKE ROTORS

(75) Inventor: Stephen John Ruiz, Redondo Beach, CA (US)

(73) Assignee: CWD, LLC, Commerce, CA (US)

( * ) Notice: Subject to any disclaimer, the term of this patent is extended or adjusted under 35 U.S.C. 154(b) by 1116 days.

(21) Appl. No.: 09/716,113

(22) Filed: Nov. 16, 2000

(51) Int. Cl.
*F16D 55/40* (2006.01)

(52) U.S. Cl. .................. 188/264 AA; 188/218 XL; 192/113.23

(58) Field of Classification Search ......... 188/218 XL, 188/264 R, 264 A, 264 AA, 17, 18 A, 26, 188/71.6; 192/113.23 X, 113.24, 113.26
See application file for complete search history.

(56) References Cited

U.S. PATENT DOCUMENTS

| | | | | |
|---|---|---|---|---|
| 3,403,760 A | * | 10/1968 | Caskey | 188/218 XL |
| 3,955,650 A | * | 5/1976 | Ellis | 188/71.1 |
| 4,263,992 A | * | 4/1981 | Moore et al. | 188/218 XL |
| 4,930,606 A | * | 6/1990 | Sporzynski et al. | 188/218 XL |
| 4,982,127 A | * | 1/1991 | Marandet | 188/264 AA |
| 5,427,212 A | * | 6/1995 | Shimazu et al. | 188/218 XL |
| 5,544,726 A | * | 8/1996 | Topouzian et al. | 188/264 A |
| 5,810,123 A | * | 9/1998 | Giorgetti et al. | 188/218 XL |
| 5,878,848 A | * | 3/1999 | Zhang | 188/218 XL |
| 5,915,747 A | * | 6/1999 | Dickerson et al. | 29/527.6 |
| 6,053,290 A | * | 4/2000 | Goddard | 188/218 XL |
| 6,247,562 B1 | * | 6/2001 | Gotti et al. | 188/218 XL |
| 6,260,669 B1 | * | 7/2001 | Daudi | 188/218 XL |

* cited by examiner

*Primary Examiner*—Xuan Lan Nguyen
(74) *Attorney, Agent, or Firm*—Blakely, Sokoloff, Taylor & Zafman LLP

(57) ABSTRACT

The invention includes a mounting hat for a brake rotor having a lower section connected to an upper section. Also included is a plurality of aerodynamically shaped standoff vanes each having a leading edge, a trailing edge, a top and a bottom connected to the upper section. Further, a plurality of vents are formed between adjacent aerodynamically shaped standoff vanes. The vents are circumferentially distributed on the upper section. Air flow is induced to flow through the plurality of vents. Alternatively included is a mounting hat for a brake rotor having a lower section connected to an upper section. Also included is a plurality of first aerodynamically shaped standoff vanes each having a leading edge, a trailing edge, a top and a bottom connected to the upper section. Further, a plurality of second aerodynamically shaped standoff vanes each having a leading edge, a trailing edge and a top connected to the upper section is included. Additionally, a plurality of vents are formed between adjacent first aerodynamically shaped standoff vanes and second aerodynamically shaped standoff vanes. The vents are circumferentially distributed on the upper section. Air flow is induced to flow through the plurality of vents.

8 Claims, 10 Drawing Sheets

AERODYNAMIC STANDOFFS TO AIR COOL DISC TYPE AUTO BRAKE ROTORS

BACKGROUND OF THE INVENTION

1. Field of the Invention

The invention includes an apparatus for improving air flow away from a disk brake rotor system used in a vehicle. More particularly, the invention relates to improved air flow motion over a disk brake rotor system used in a vehicle through aerodynamic standoffs.

2. Background Information

Friction brakes are used in cars, trains, airplanes, elevators, motorcycles and other machines. In order to slow or stop an automobile, a driver may step on a brake pedal. Through mechanical linkage, the movement of the brake pedal is transmitted to a set of opposing fixed brake pads, between which is a brake rotor that rotates as the axle of the automobile turns from the rotation of the wheel assembly due to energy stored in the vehicle as either kenetic or potential. The brake rotor may be fixed to the hub of a vehicle axle by an array of drive pin or drive lug/bolt combinations radially distributed about the axle. The brake rotor and the hub may be secured to one another by tightening each bolt and washer into its counter part drive pin or drive lug.

As the driver applies force to the brake pedal, that force may be transmitted as friction to the moving brake rotor by the fixed brake pads so as to slow the vehicle down or bring it to rest through controlled slippage. The energy absorbed by the controlled slippage may be converted into heat, principally within the brake rotor. In high performance vehicle applications, vents may be supplied between the inboard brake disc and the outboard brake disc to channel air over the surfaces of the discs so as to draw heat away from the discs. See, e.g., U.S. Pat. No. 5,878,848, entitled "Ventilated Brake Rotor." Moreover, as illustrated in U.S. Pat. No. 5,915,747, entitled "Method of Making a Rotor with Vented Hat Section and an Initial Casting," vents may be added to the sidewall of the brake rotor hub (or "mounting hat") to aid in cooling.

In addition to vents, brake rotor hub radial standoffs may be provided (i) to form a brake rotor/hub mating surface and (ii) to elevate the brake rotor hub from the brake rotor.

SUMMARY

The invention includes a mounting hat for a brake rotor having a lower section connected to an upper section. Also included is a plurality of aerodynamically shaped standoff vanes each having a leading edge, a trailing edge, a top and a bottom connected to the upper section. Further, a plurality of vents are formed between adjacent aerodynamically shaped standoff vanes. The vents are circumferentially distributed on the upper section. Air flow is induced to flow through the plurality of vents.

Alternatively included is a mounting hat for a brake rotor having a lower section connected to an upper section. Also included is a plurality of first aerodynamically shaped standoff vanes each having a leading edge, a trailing edge, a top and a bottom connected to the upper section. Further, a plurality of second aerodynamically shaped standoff vanes each having a leading edge, a trailing edge and a top connected to the upper section is included. Additionally, a plurality of vents are formed between adjacent first aerodynamically shaped standoff vanes and second aerodynamically shaped standoff vanes. The vents are circumferentially distributed on the upper section. Air flow is induced to flow through the plurality of vents.

Further, a brake rotor having a rotor and a hub having a plurality of aerodynamically shaped standoff vanes each having a leading edge, a trailing edge, a top, a bottom and a plurality of vents formed between adjacent aerodynamically shaped standoff vanes connected to the rotor is presented. The vents are circumferentially distributed between the hub and the rotor. Air flow is induced to flow through the plurality of vents.

Lastly, A brake rotor having a rotor and a hub having a plurality of first aerodynamically shaped standoff vanes each having a leading edge, a trailing edge, a top and a bottom connected to the hub is presented. A plurality of second aerodynamically shaped standoff vanes each having a leading edge, a trailing edge and a top connected to the hub is also presented. Also, a plurality of vents formed between adjacent first aerodynamically shaped standoff vanes and second aerodynamically shaped standoff vanes is included. The vents are circumferentially distributed between the hub and the rotor. Air flow is induced to flow through the plurality of vents.

DETAILED DESCRIPTION OF THE INVENTION

Figure 1:
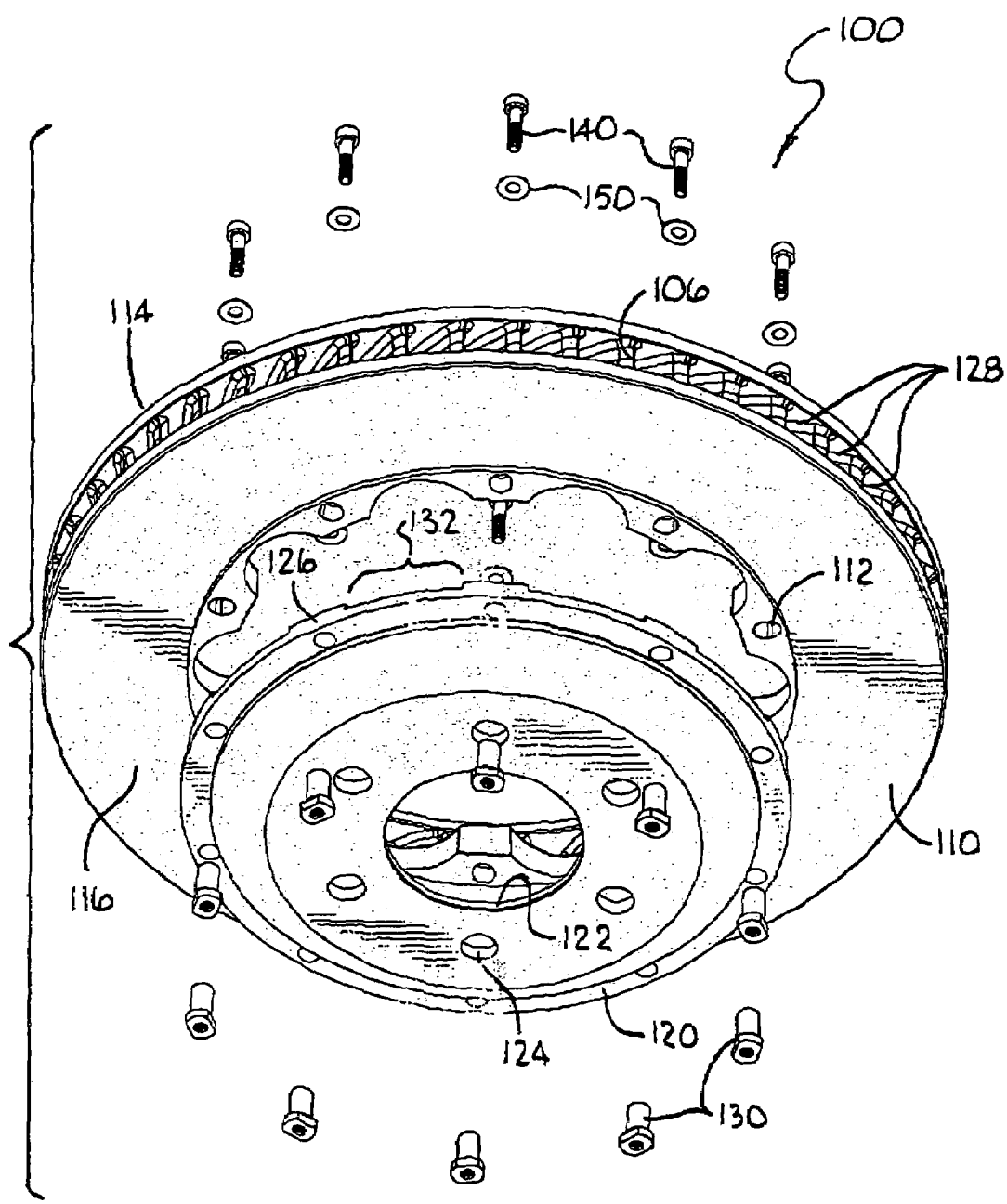
FIG. 1 illustrates a brake rotor with hub or mounting hat.

FIG. 1 is an exploded isometric view of brake rotor assembly 100. Included with brake rotor assembly 100 may be rotor 110, hub or mounting hat 120, drive pins/lugs 130, bolts 140, and washers 150. In some lower performance applications, rotor 110 and hub 120 may be one piece. As shown, rotor 110 may be an annular ring having slots 112 disposed on the interior of the ring. Slots 112 may be used to connect rotor 110 to hub 120 and yet allow for thermal expansion of rotor 110.

Hub 120 may be an annular disc that includes axle hole 122 and pin/lug holes 124. Axle hole 122 may be where an axle of a vehicle might extend into so as to maintain rotor 110 adjacent to the brake pads and tire of the vehicle. Drive pins/lugs 130 may have a threaded interior and are extended through pin/lug holes 124 and slots 112 so as to bring hub 120 in contact with rotor 110. Drive pins/lugs 130 may be squared to remove excessive material for weight savings. Washers 150 are inserted around bolts 140 and bolts 140 are threaded into drive pin/lug 130. Tightening bolts 140 into drive pins/lugs 130 fixes hub 120 to rotor 110 in the rotational and axial directions, but frees rotor 110 to expand in the radial direction.

Brake rotor 110 may include vanes 106 disposed between inboard brake disc 114 and outboard brake disc 116. Vanes 106 may form vents 128 to channel air over the facing surfaces of inboard brake disc 114 and outboard brake disc 116 to draw heat away from the discs.

In addition to vents 128, hub 120 may include standard standoffs 126. Standoffs 126 may be elevated and have a top surface to form a brake rotor/hub mating surface. On mating, the elevation of brake rotor hub 120 from brake rotor 110 forms gaps 132 that may further channel portions of air over a surface of outboard disc 116 as brake rotor assembly 100 rotates.

Figure 2:
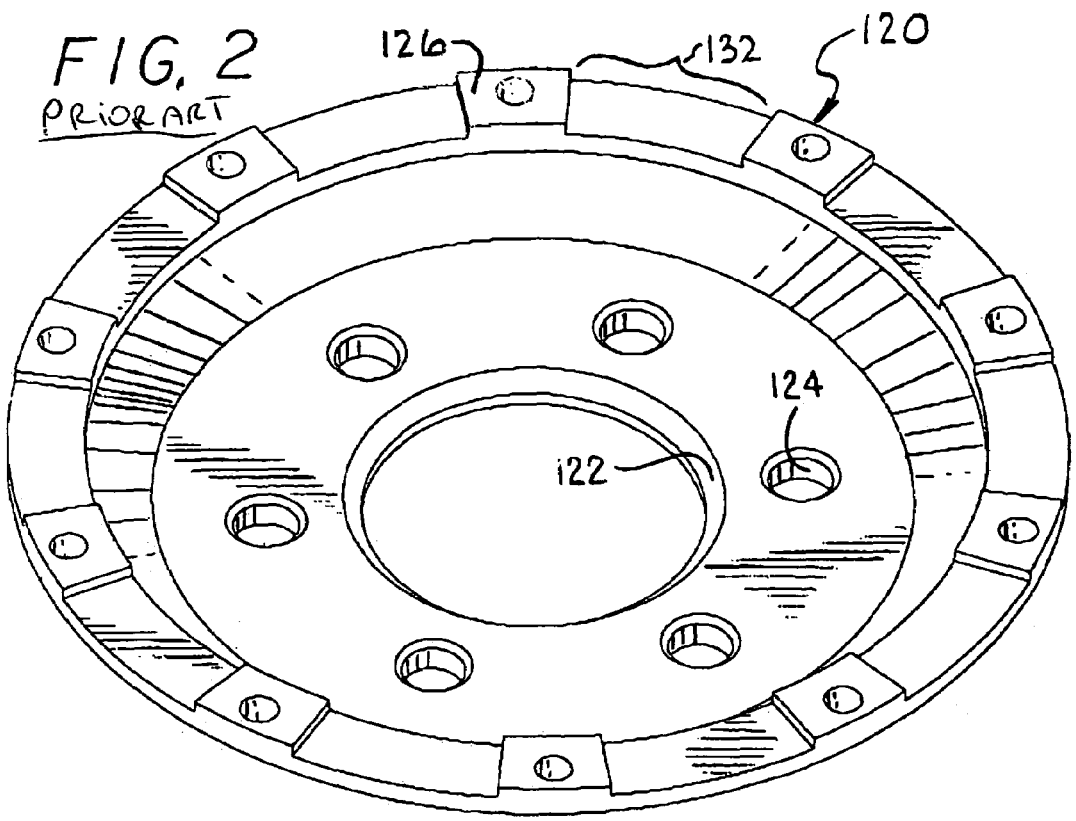
FIG. 2 illustrates a typical hub or mounting hat with rectangular shaped standoff vanes.

FIG. 2 is an isometric view of traditional hub or mounting hat 120 from the brake rotor side. Standoffs 126 may be evenly distributed radially about axle hole 122. The perimeter of each standoff conventionally is shaped for manufacturing purposes (such as for machining or molding) rather than for operational purposes. As illustrated, standoffs 126 conventionally define straight edge profile such as a square or rectangular shape. As hub 120 rotates about axle hole 122, the straight edge profile of standoffs 126 push air out of its way with little thought as to a preferred direction of the air. In other words, the square or rectangular shape of the standoff is not aerodynamically shaped. Delaminating turbulent waves are formed behind and in front of the square or rectangular shaped standoffs 126 as air is deflected off the rotor. The delaminated air does not contribute to transferring heat away from rotor 110 through convection and, therefore does not contribute towards efficiently cooling it down.

Figure 3:
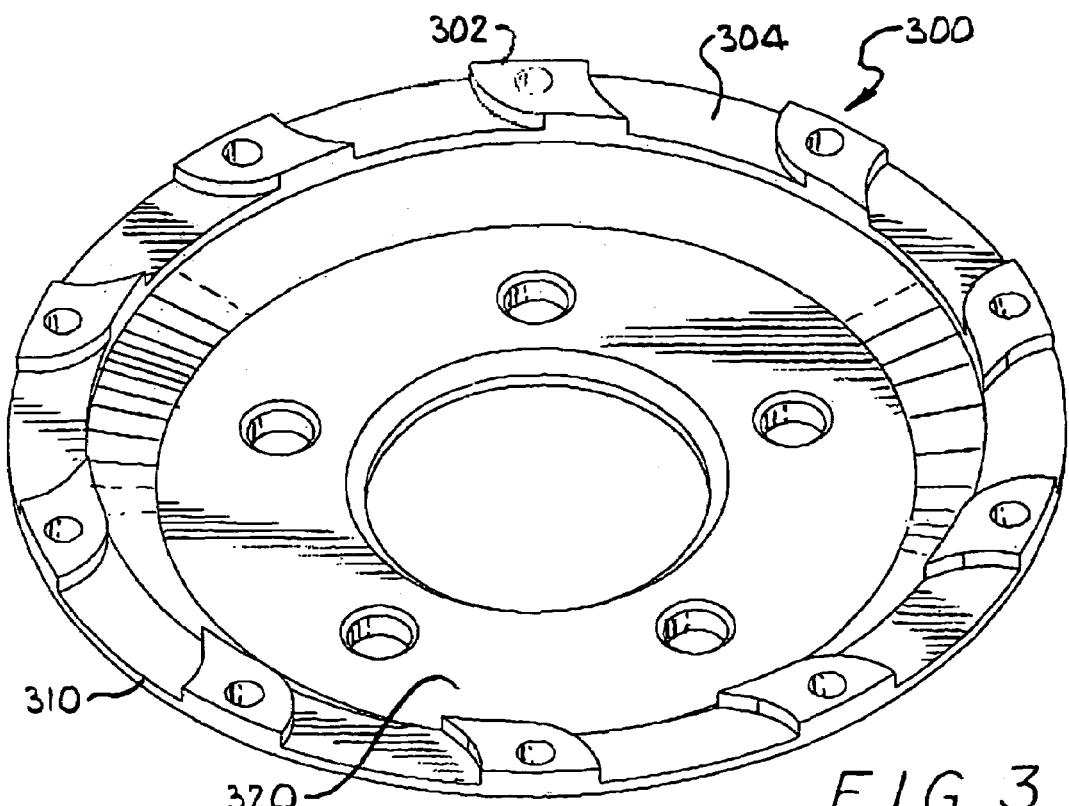
FIG. 3 illustrates an embodiment of the invention having aerodynamically shaped standoff vanes.
Figure 4:
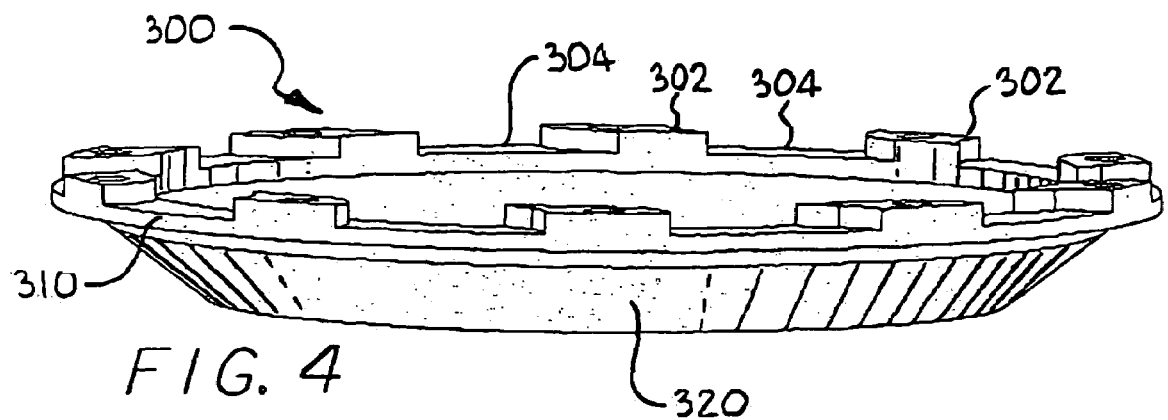
FIG. 4 illustrates a side view of an embodiment of the invention having aerodynamically shaped standoff vanes.

FIG. 3 illustrates an embodiment of the invention with hub or mounting hat 300 having aerodynamically shaped standoff vanes 302. Hub 300 also includes upper section 310 and lower section 320. FIG. 4 illustrates a side view of the embodiment of the invention illustrated in FIG. 3. In FIG. 3, Two adjacent standoff vanes 302 may define vents 304. Vents 304 may be distributed circumferentially on upper section 310 on hub 300. As hub 300 turns about the axle of a vehicle, standoff vanes 302 work to induce air flow from the radial interior of hub 300, through vents 304, and out to the radial exterior of hub 300. In other words, air flow is induced by the shape of standoff vanes 302 and the centrifugal acceleration of the air in vents 304 when hub 300 is turning and turbulent air is thus reduced. It should be noted that hub 300 and brake rotor 110 may also be formed as a solid brake rotor.

Figure 5:
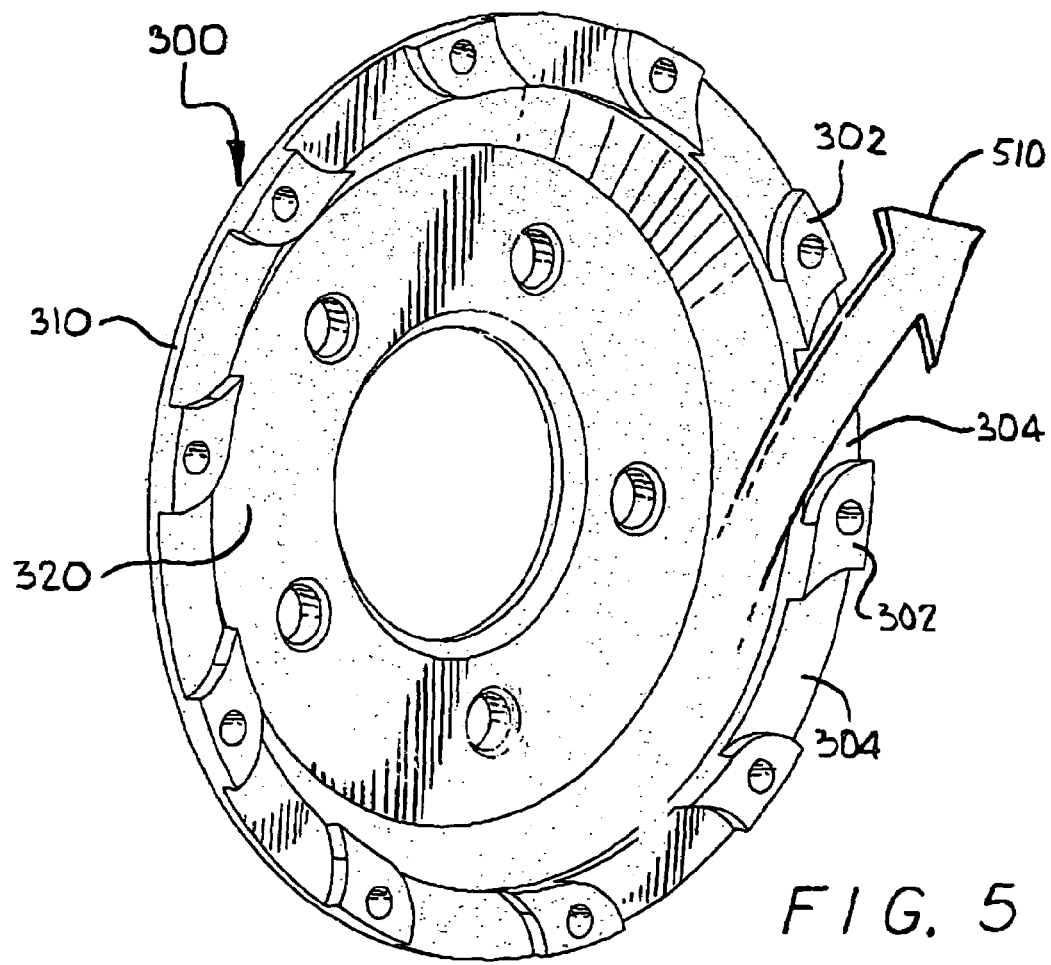
FIG. 5 illustrates air flow through vents formed by an embodiment of the invention having aerodynamically shaped standoff vanes.
Figure 6:
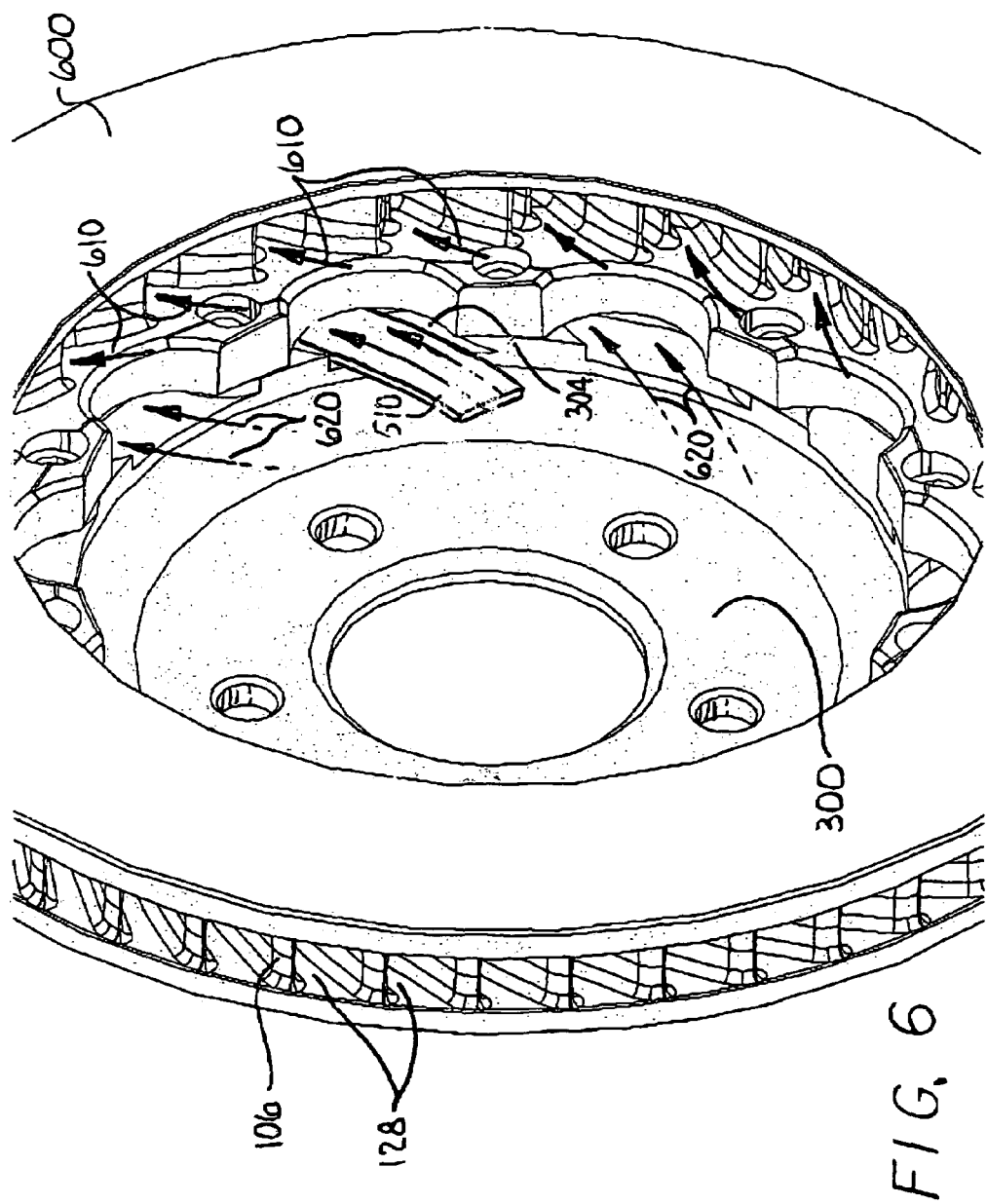
FIG. 6 illustrates the induced path of delaminated air from rotor vents in an embodiment of the invention having aerodynamically shaped standoff vanes.

FIG. 5 illustrates the direction of air flow 510 through vents 304. The air passing within vents 304 passes over outboard brake disc 116 of FIG. 1 and expels the heat radially outward in the direction of the moving hub 300. This process works towards transferring heat away from rotor 110 through convection and cools the rotor down in an efficient manner. FIG. 6 illustrates air flow through vents 128 directed by vanes 106 and the air flow induced to flow through vents 304. Air flow 620 that is deflected by vanes 106 and rotor 600 is induced into vents 304 and flows in flow direction 510. Therefore, additional air flow is directed towards outboard brake disc 116 of FIG. 1 and heat is expelled radially outward in the direction of the moving hub 300 providing more efficient cooling.

Aerodynamically shaped standoff vanes 302 can vary in length, height, width and shape to optimally increase the air flow to be induced through vents 304. In one embodiment, the leading edge of the aerodynamically shaped standoff vanes 302 is curved, as is the trailing edge. Both the leading edge and trailing edge of aerodynamically shaped standoff vanes 302 need not be symmetrical. In one embodiment, the leading and trailing edges of aerodynamically shaped standoff vanes 302 are stepped up at 90 degrees from the upper section 310 to the height of the aerodynamically shaped standoff vane 302 (i.e., perpendicular to upper section 310). In another embodiment, the leading and trailing edge of aerodynamically shaped standoff vanes 302 can be ramped or curved up at varying angles and dimensions from the upper section 310 to the height of the aerodynamically shaped standoff vane 302 to increase induced air flow.

In one embodiment, aerodynamically shaped standoff vanes 302 are placed so that the rotor is unidirectional. In another embodiment, a symmetrical design allows for a bi-directional rotor, which reduces inventory and eases exchange between vehicle wheels. The shapes and sizes of the aerodynamically shaped standoff vanes 302 can have height adjusted depending on the application and the type of vehicle. There is a tradeoff of weight versus height of the aerodynamically shaped standoff vanes 302. For example, in high performance racing cars, where weight is important and stress factors are increased over standard type of vehicles, the height of the aerodynamically shaped standoff vanes 302 may typically be about 5 mm. A standard height of the aerodynamically shaped standoff vanes 302 may range between 2 mm-4 mm. The width of aerodynamically shaped standoff vanes 302 are typically based on the complimentary dry flange so that the counter part and the width of the aerodynamically shaped standoff vanes 302 are close to being matched. One skilled in the art will note that the width can vary from the complementary dry flange counterpart.

The number of aerodynamically shaped standoff vanes 302 is predetermined by drive pins/lugs 130 and number of lugs on the vehicle, which are determined by the amount of load and design of the drive mechanism.

Figure 7:
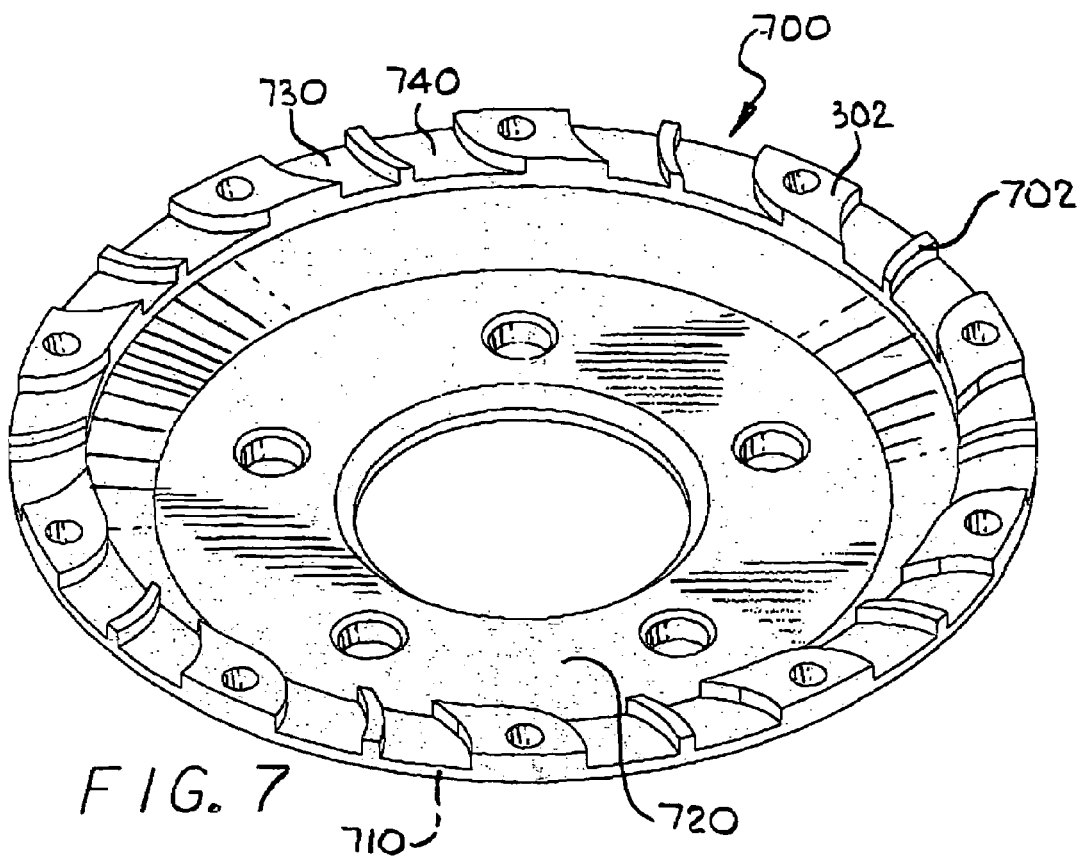
FIG. 7 illustrates an embodiment of the invention having aerodynamically shaped standoff vanes with additional aerodynamically shaped standoff vanes.
Figure 8:
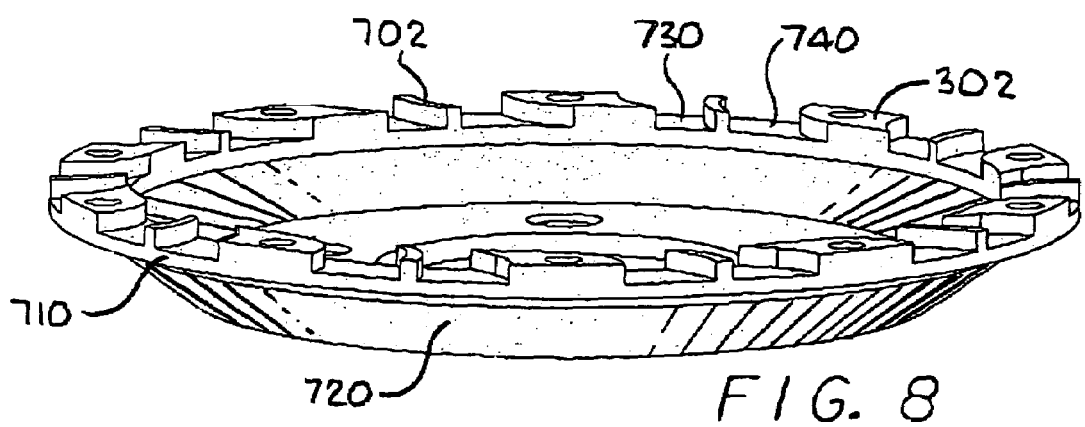
FIG. 8 illustrates a side view of an embodiment of the invention having aerodynamically shaped standoff vanes with additional aerodynamically shaped standoff vanes.

FIG. 7 illustrates an embodiment of the invention with hub or mounting hat 700 having aerodynamically shaped standoff vanes 302 and additional aerodynamically shaped standoff vanes 702. Hub 700 also includes upper section 710 and lower section 720. FIG. 8 illustrates a side view of the embodiment illustrated in FIG. 7. In FIG. 7, besides the two aerodynamically shaped standoff vanes 302 and 702, additional aerodynamically shaped standoff vanes can be added to hub 700 to increase air flow through vents defined between adjacent standoff vanes. Adjacent standoff vanes 302 and 702 may define vents 730 and 740. Vents 730 and 740 may be distributed circumferentially on upper section 710. As hub 700 turns about the axle of a vehicle, standoff vanes 302 and 702 work to induce air flow from the radial interior of hub 700, through vents 730 and 740, and out to the radial exterior of hub 700. In other words, air flow is induced by the shape of standoff vanes 302 and 702 and the centrifugal acceleration of the air in vents 730 and 740 when hub 700 is turning and turbulent air is reduced. The air passing within vents 730 and 740 passes over outboard brake disc 116 of FIG. 1 and expels heat radially outward in the direction of the moving hub 700. One skilled in the art will recognize as additional aerodynamically shaped standoff vanes are added to hub 700, additional smaller vents are formed on upper section 710. It should be noted that hub 700 and brake rotor 110 may also be formed as a solid brake rotor.

Aerodynamically shaped standoff vanes 702 can vary in length, height, width and shape to optimally increase the air flow to be induced through vents 730 and 740. In one embodiment, the leading edge of the aerodynamically shaped standoff vanes 702 is curved, as is the trailing edge. Both the leading edge and trailing edge of aerodynamically shaped standoff vanes 702 need not be symmetrical. In one embodiment, the leading and trailing edge of aerodynamically shaped standoff vanes 702 is stepped up at 90 degrees from upper section 710 to the height of aerodynamically shaped standoff vanes 702 (i.e., perpendicular to upper section 710). In another embodiment, the leading and trailing edge of aerodynamically shaped standoff vanes 702 can be ramped or curved up at varying angles and dimensions, from upper section 710 to the height of the aerodynamically shaped standoff vanes 702 to increase induced air flow.

In one embodiment, aerodynamically shaped standoff vanes 702 are placed so that the rotor is unidirectional. In another embodiment, a symmetrical design can allow for a bi-directional rotor, which reduces inventory and eases exchange between vehicle wheels. The shapes and sizes of aerodynamically shaped standoff vanes 702 can have height adjusted depending on the application and the type of vehicle. There is a tradeoff of weight versus height of the aerodynamically shaped standoff vanes 702. For example, in high performance racing cars, where weight is important and stress factors are increased over standard type of vehicles, the height of the aerodynamically shaped standoff vanes 702 may typically be about 5 mm. A standard height of the aerodynamically shaped standoff vanes 702 may typically range between 2 mm-4 mm. One skilled in the art will note that in hub 700, the height of aerodynamically shaped standoff vanes 302 and 702 can vary from each other to increase air flow through vents formed between aerodynamically shaped standoff vanes. The width of aerodynamically shaped standoff vanes 702 may vary, thus varying the size of vents.

In hub 700, the number of aerodynamically shaped standoff vanes 302 is predetermined by drive pins/lugs 130 and number of lugs on the vehicle, which are determined by the amount of load and design of the drive mechanism. Aerodynamically shaped standoff vanes 702, however, are not predetermined by drive pins/lugs 130 and the number of lugs on the vehicle.

Figure 9:
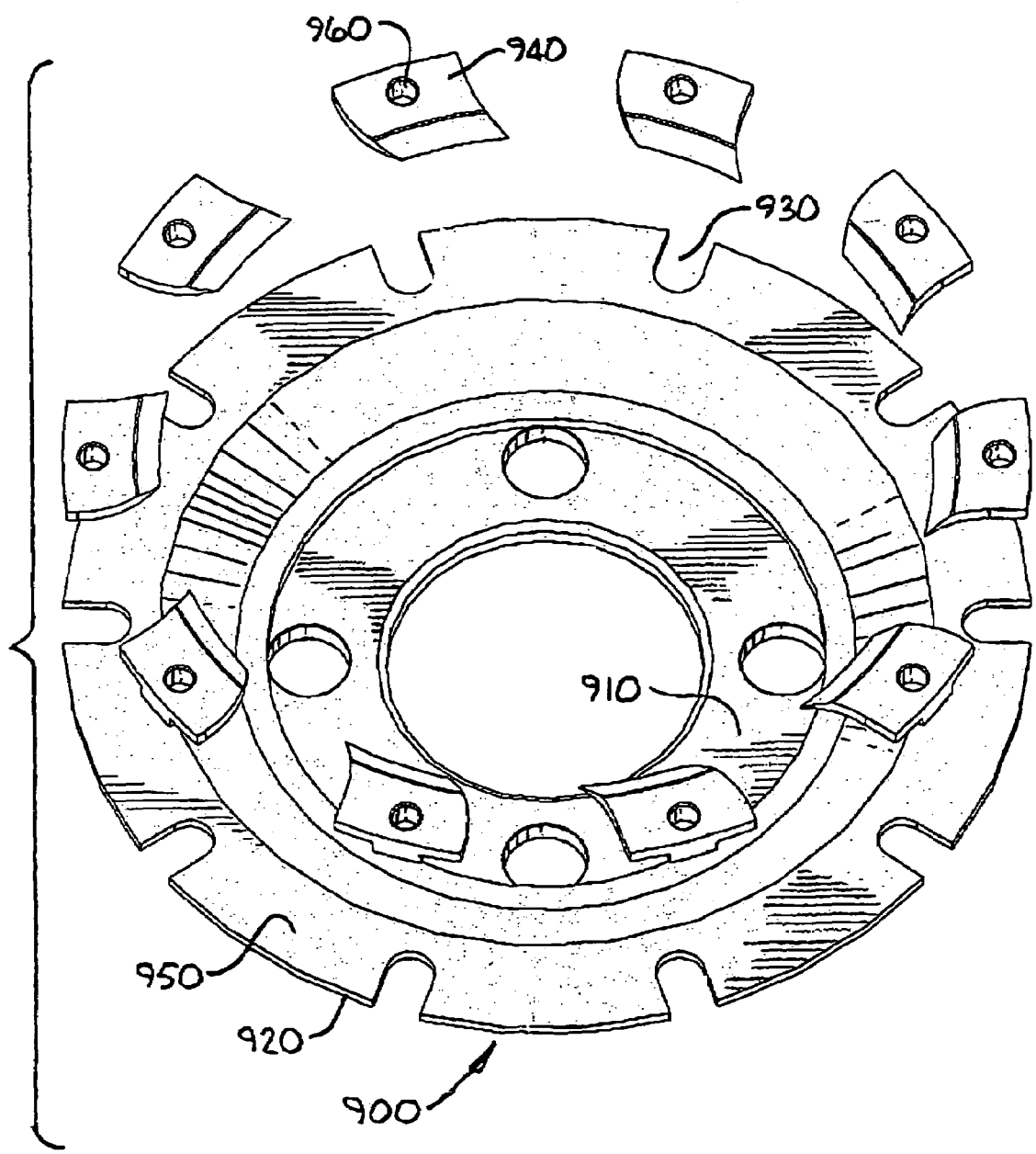
FIG. 9 illustrates an embodiment of the invention where the hub or mounting hat is formed so as to accept separate aerodynamically shaped standoff vanes.
Figure 10:
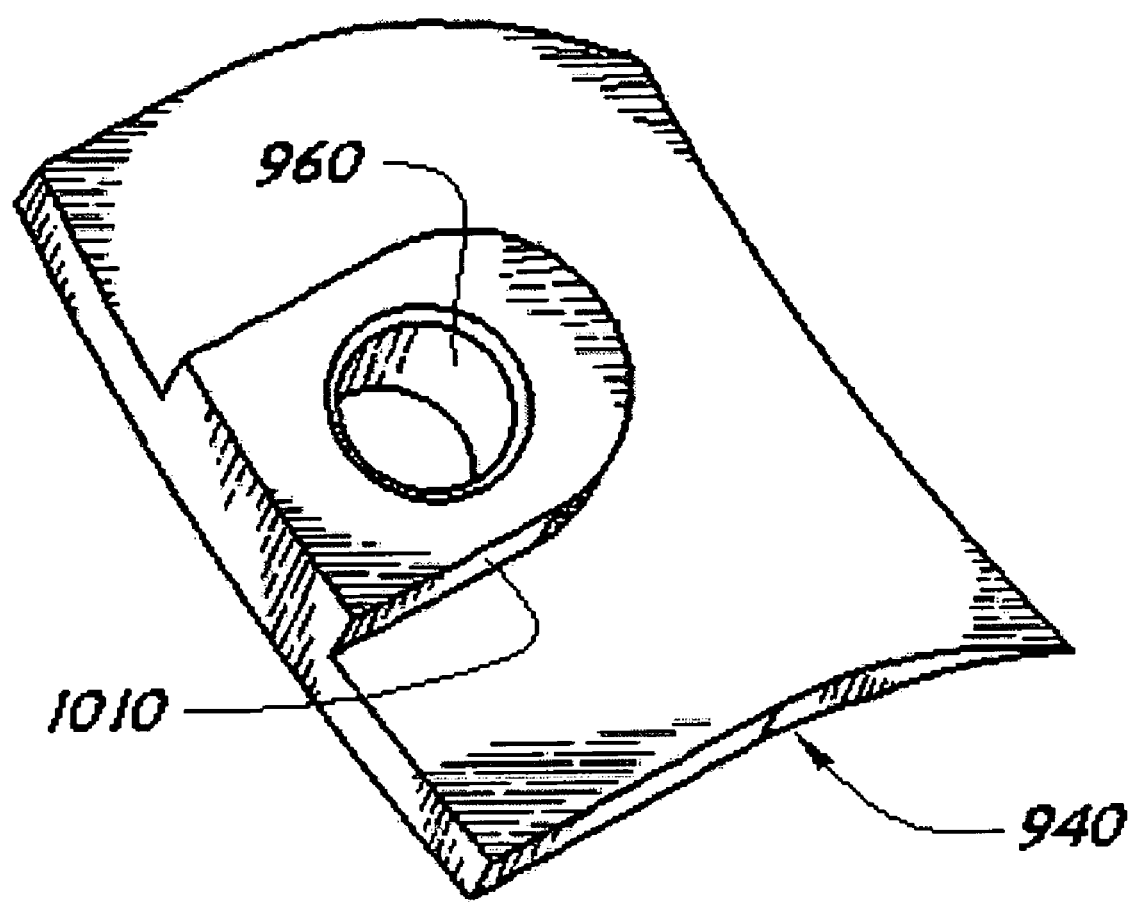
FIG. 10 illustrates separate aerodynamically shaped standoff vane.

FIG. 9 illustrates an embodiment of the invention with hub or mounting hat 900 having a lower section 910 and an upper section 920. Upper portion 920 can accept separate aerodynamically shaped standoff vanes 940 into openings 930 on upper section 920. One skilled in the art will recognize that additional openings can be formed on upper section 920 for additional aerodynamically shaped standoff vanes that are separate from hub 900. Also, one skilled in the art will recognize that upper section 920 can also have additional aerodynamically shaped standoff vanes formed on upper section 920 between adjacent aerodynamically shaped standoff vanes 940. FIG. 10 illustrates separate aerodynamically shaped standoff vanes 940 with extension section 1010 that can be coupled with hub or mounting hat 900 via openings 930. Openings 930 may vary in shape and size depending on the application and the shape and size of extension section 1010 which, can also vary in shape and size depending on the application.

Figure 11:
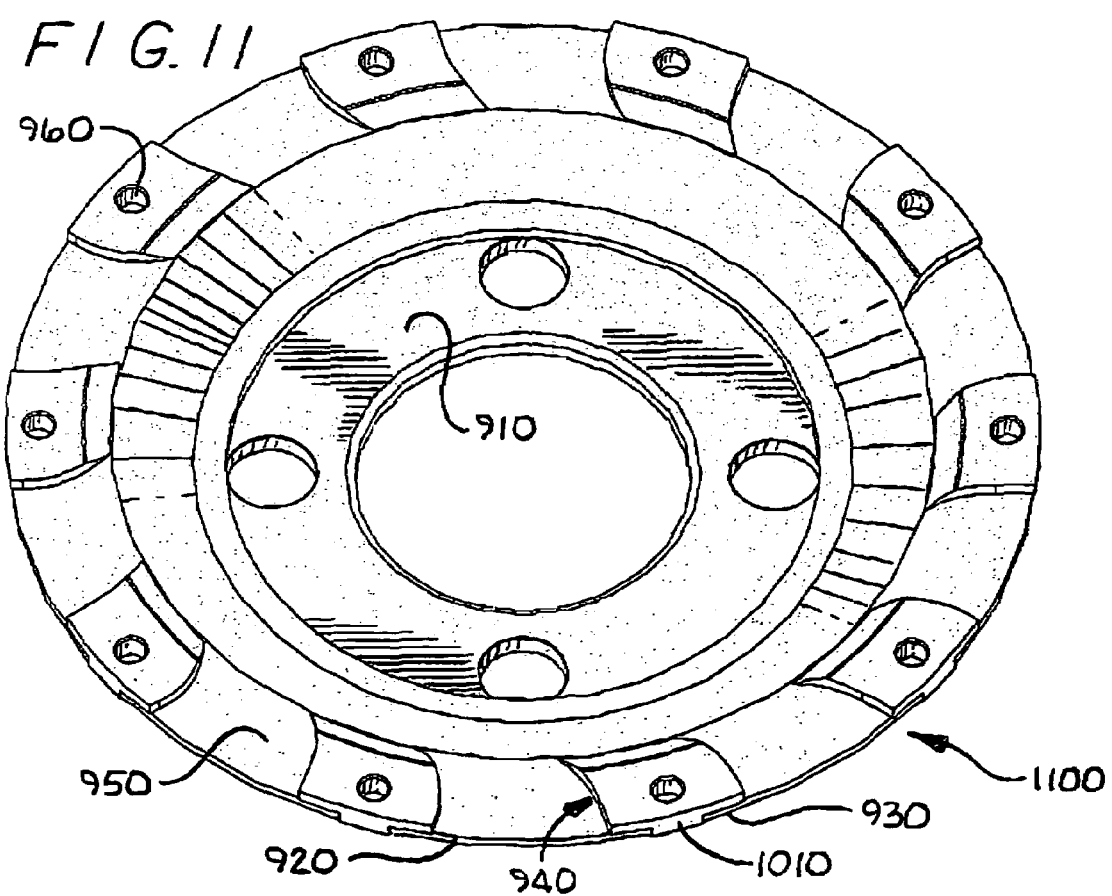
FIG. 11 illustrates separate aerodynamically shaped standoff vanes coupled to a hub or mounting hat having openings on an upper section.

FIG. 11 illustrates hub or mounting hat 1100 having separate aerodynamically shaped standoff vanes 940 fitted into openings 930 on upper section 920. Extension section 1010 of aerodynamically shaped standoff vanes 940 is made so that it fits snug into openings 930. Adjacent aerodynamically shaped standoff vanes 940 may define vents 950.

In FIG. 11, it can be readily seen that additional aerodynamically shaped standoff vanes can be added to hub 1100 to increase air flow through vents defined between adjacent standoff vanes 940. Vents formed by adjacent aerodynamically shaped standoff vanes 940 may be distributed circumferentially on upper section 920. As hub 1100 turns about the axle of a vehicle, standoff vanes work to induce air flow from the radial interior of hub 1100, through vents, and out to the radial exterior of hub 1100. In other words, air flow is induced by the shape of standoff vanes and the centrifugal acceleration of the air in vents when hub 1100 is turning and turbulent air is reduced. The air passing within vents passes over outboard brake disc 116 of FIG. 1 and expels heat radially outward in the direction of the moving hub 1100. One skilled in the art will recognize as additional aerodynamically shaped standoff vanes are added to hub 1100, additional smaller vents are formed on upper section 920.

Aerodynamically shaped standoff vanes 940 can vary in length, height, width and shape to optimally increase the air flow to be induced through vents. In one embodiment, the leading edge of the aerodynamically shaped standoff vanes 940 is curved, as is the trailing edge. Both the leading edge and trailing edge of aerodynamically shaped standoff vanes 940 need not be symmetrical. In one embodiment, the leading and trailing edge of aerodynamically shaped standoff vanes 940 is stepped up at 90 degrees from upper section 920 to the height of aerodynamically shaped standoff vanes 940 (i.e., perpendicular to upper section 920). In another embodiment, the leading and trailing edge of aerodynamically shaped standoff vanes 940 can be ramped or curved up at varying angles and dimensions, from upper section 920 to the height of the aerodynamically shaped standoff vanes 940 to increase induced air flow.

In one embodiment, aerodynamically shaped standoff vanes 940 are placed so that the rotor is unidirectional. Separate aerodynamically shaped standoff vanes 940 with extension section 1010 can be coupled to a hub or mounting hat that typically does not contain standoff vanes. Thus, transforming ordinary non-aerodynamic hubs into hubs containing separate aerodynamically shaped standoff vanes 940 with extension section 1010 to optimally increase the air flow to be induced through formed vents. Moreover, separate sets of aerodynamically shaped standoff vanes 940 with extension section 1010, where each set may be oppositely contoured, can reduce inventory of hubs or mounting hats since they may be coupled to the same bi-directional hub. Thus transforming the bi-directional hubs to unidirectional hubs. This feature reduces inventory and eases exchange between vehicle wheels.

The shapes and sizes of aerodynamically shaped standoff vanes 940 can have height adjusted depending on the application and the type of vehicle. There is a tradeoff of weight versus height of the aerodynamically shaped standoff vanes 940. For example, in high performance racing cars, where weight is important and stress factors are increased over standard type of vehicles, the height of the aerodynamically shaped standoff vanes 940 may typically be about 5 mm from upper section 920 to the top of aerodynamically shaped standoff vanes 940. A standard height of the aerodynamically shaped standoff vanes 940 may typically range between 2 mm-4 mm. One skilled in the art will note that in hub 1100, the height of aerodynamically shaped standoff vanes 940 can vary from each other to increase air flow through vents formed between aerodynamically shaped standoff vanes. The width of aerodynamically shaped standoff vanes 940 may vary, thus varying the size of vents.

In hub 1100, the number of aerodynamically shaped standoff vanes 940 is predetermined openings 930, by drive pins/lugs 130 that fit in space 960 and number of lugs on the vehicle, which are determined by the amount of load and design of the drive mechanism. Additionally added aerodynamically shaped standoff vanes added between aerodynamically shaped standoff vanes 940, however, are not predetermined by drive pins/lugs 130 and the number of lugs on the vehicle.

Figure 12:
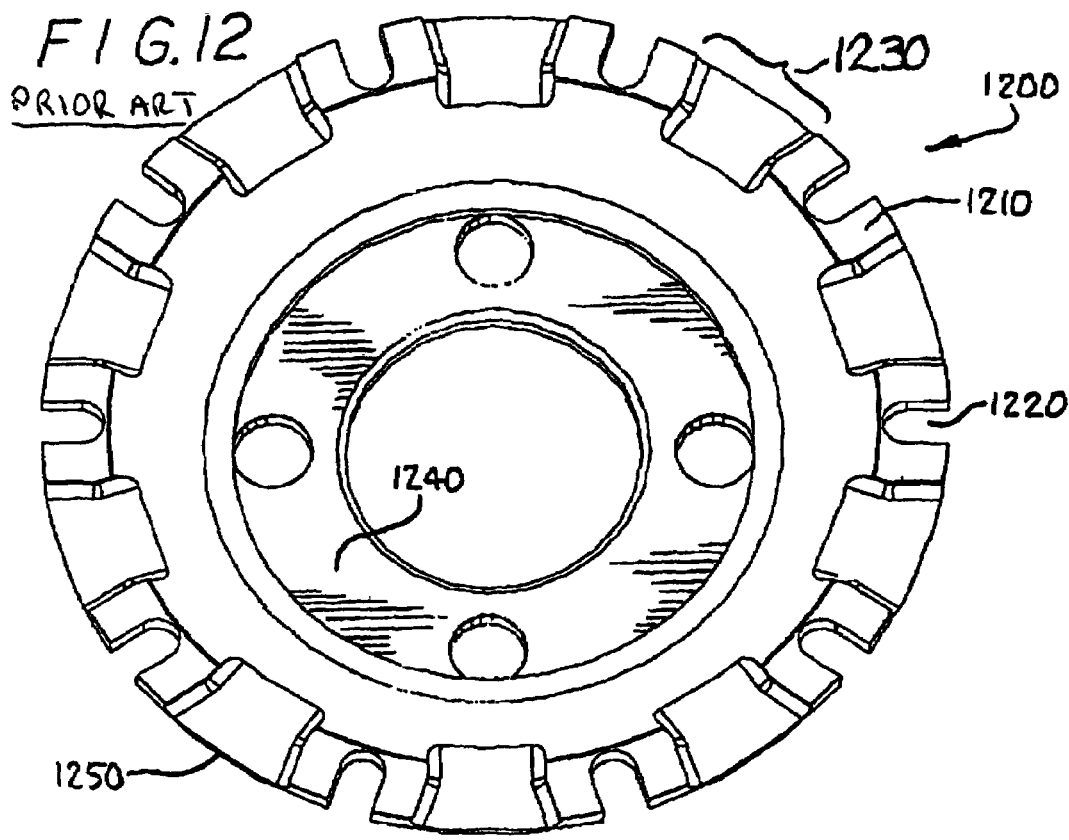
FIG. 12 illustrates a traditional hub or mounting hat with squared standoffs and openings.

FIG. 12 is an isometric view of traditional hub or mounting hat 1200 from the brake rotor side. Traditional hub 1200 typically has openings 1220, upper section 1250, lower section 1240, and a gap 1230 between adjacent standoffs 1210. Standoffs 1210 may be evenly distributed radially about upper section 1250 on hub 1200. The perimeter of each standoff conventionally is shaped for manufacturing purposes (such as for machining or molding) rather than for operational purposes. As illustrated, standoffs 1210 conventionally define straight edge profile such as a square or rectangular shape. As hub 1200 rotates about the axle hole, the straight edge profile of standoffs 1210 push air out of its way with little thought as to a preferred direction of the air. In other words, the square or rectangular shape of the standoff is not aerodynamically shaped. Delaminating turbulent waves are formed behind and in front of the square or rectangular shaped standoffs 1210 as air is deflected off the rotor. The delaminated air does not contribute to transferring heat away from rotor 110 through convection and, therefore does not contribute towards efficiently cooling it down.

Figure 13:
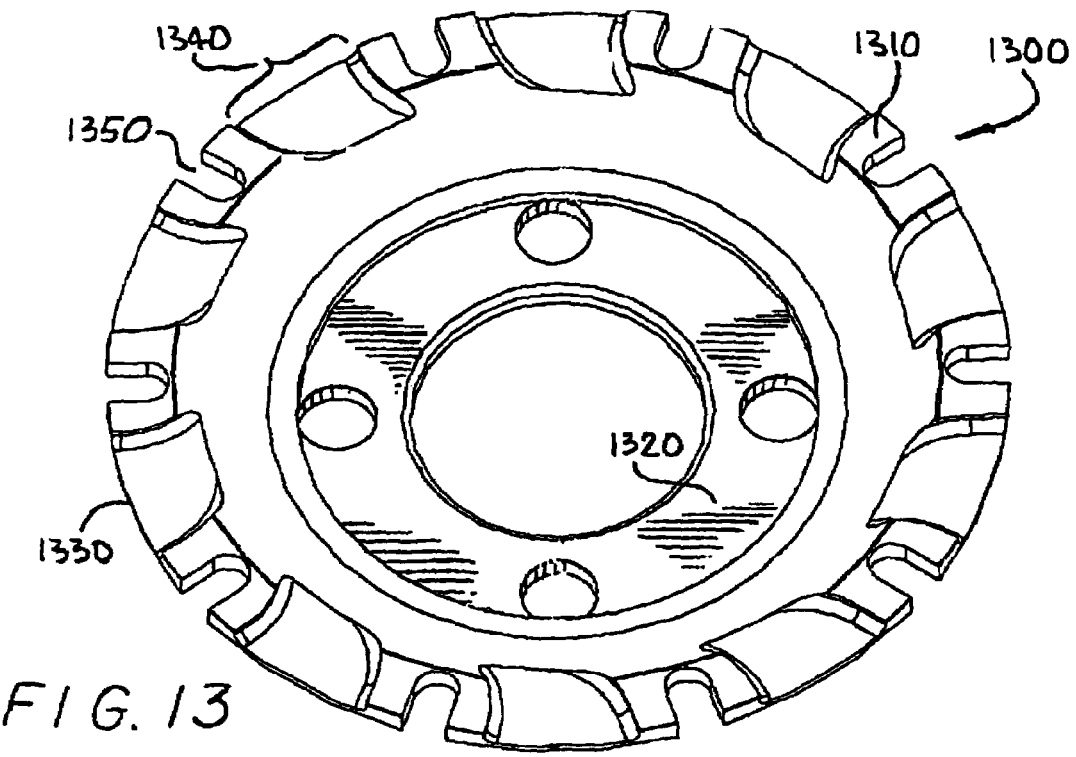
FIG. 13 illustrates an embodiment of the invention with aerodynamically shaped standoff vanes coupled to a hub or mounting hat having openings on an upper section.

FIG. 13 illustrates an embodiment of the invention with hub or mounting hat 1300 having aerodynamically shaped standoff vanes 1310. Hub 1300 also includes upper section 1330, lower section 1320, and opening 1350. In FIG. 3, Two adjacent standoff vanes 1310 may define vents 1340. Vents 1340 may be distributed circumferentially on upper section 1330 on hub 1300. As hub 1300 turns about the axle of a vehicle, standoff vanes 1310 work to induce air flow from the radial interior of hub 1300, through vents 1340, and out to the radial exterior of hub 1300. In other words, air flow is induced by the shape of standoff vanes 1310 and the centrifugal acceleration of the air in vents 1340 when hub 1300 is turning and turbulent air is thus reduced. It should be noted that hub 1300 and brake rotor 110 may also be formed as a solid brake rotor.

Figure 14:
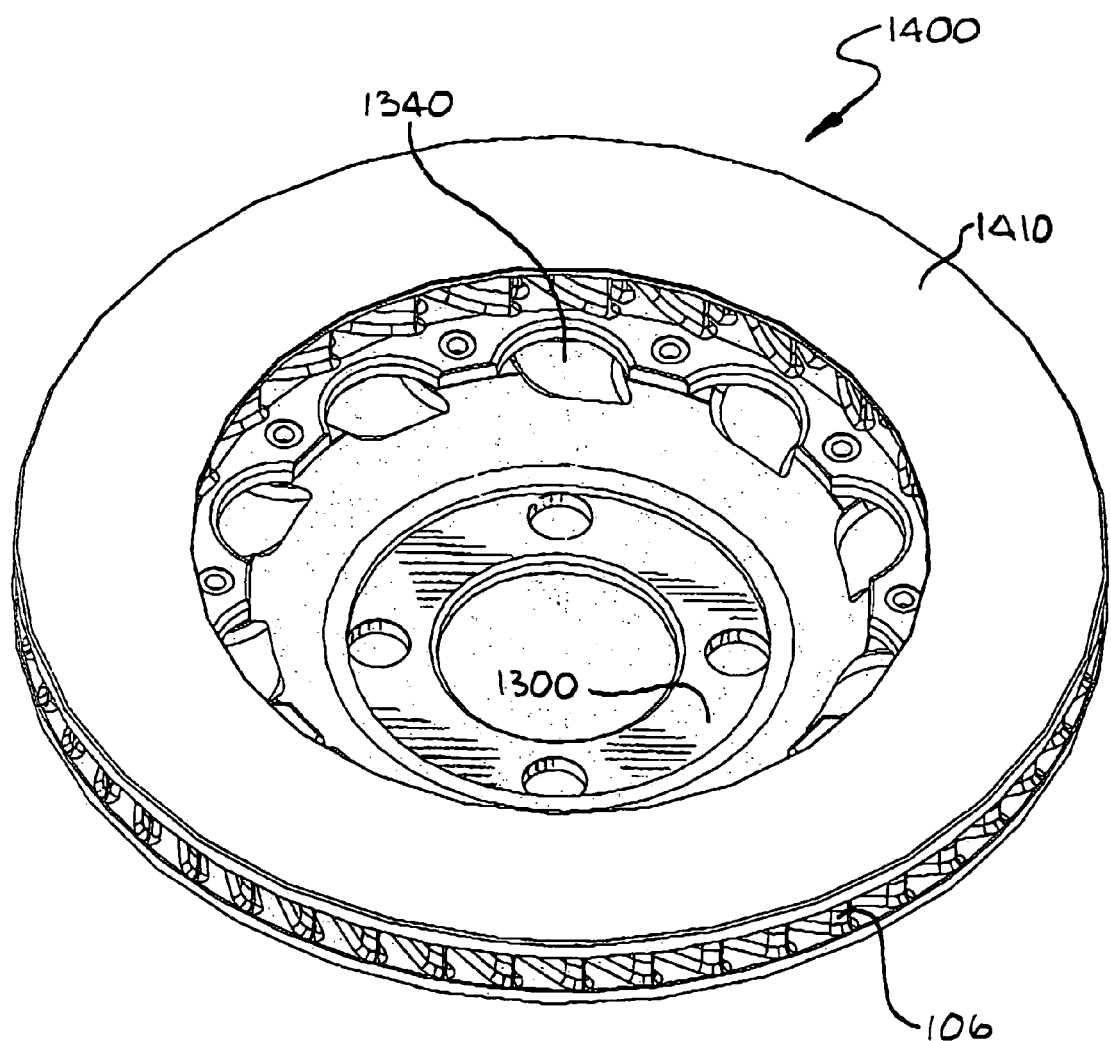
FIG. 14 illustrates the embodiment of FIG. 13 coupled with a rotor.

FIG. 14 illustrates brake rotor system 1400 having hub 1300 coupled to rotor 1410. The air passing within vents 1340 passes over outboard brake disc 116 of FIG. 1 and expels the heat radially outward in the direction of the moving hub 1300. This process works towards transferring heat away from rotor 1410 through convection and cools the rotor down in an efficient manner. Air flow that is deflected by vanes 106 and rotor 1410 is induced into vents 1340. Therefore, additional air flow is directed towards outboard brake disc 116 of FIG. 1 and heat is expelled radially outward in the direction of the moving hub 1300 providing more efficient cooling.

Aerodynamically shaped standoff vanes 1340 can vary in length, height, width and shape to optimally increase the air flow to be induced through vents 1340. In one embodiment, the leading edge of the aerodynamically shaped standoff vanes 1340 is curved, as is the trailing edge. Both the leading edge and trailing edge of aerodynamically shaped standoff vanes 1340 need not be symmetrical. In one embodiment, the leading and trailing edges of aerodynamically shaped standoff vanes 1340 are stepped up at 90 degrees from the upper section 1330 to the height of the aerodynamically shaped standoff vane 1340 (i.e., perpendicular to upper section 1330). In another embodiment, the leading and trailing edge of aerodynamically shaped standoff vanes 1340 can be ramped or curved up at varying angles and dimensions from the upper section 1330 to the height of the aerodynamically shaped standoff vane 1340 to increase induced air flow.

In one embodiment, aerodynamically shaped standoff vanes 1340 are placed so that the rotor is unidirectional. In another embodiment, a symmetrical design allows for a bi-directional rotor, which reduces inventory and eases exchange between vehicle wheels. The shapes and sizes of the aerodynamically shaped standoff vanes 1340 can have height adjusted depending on the application and the type of vehicle. There is a tradeoff of weight versus height of the aerodynamically shaped standoff vanes 1340. For example, in high performance racing cars, where weight is important and stress factors are increased over standard type of vehicles, the height of the aerodynamically shaped standoff vanes 1340 may typically be about 5 mm. A standard height of the aerodynamically shaped standoff vanes 1340 may range between 2 mm-4 mm. The width of aerodynamically shaped standoff vanes 1340 are typically based on the complimentary dry flange so that the counter part and the width of the aerodynamically shaped standoff vanes 1340 are close to being matched. One skilled in the art will note that the width can vary from the complementary dry flange counterpart.

The number of aerodynamically shaped standoff vanes 1340 is predetermined by drive pins/lugs or connectors to be inserted through openings 1350 and number of lugs on the vehicle, which are determined by the amount of load and design of the drive mechanism.

The exemplary embodiments described herein are provided merely to illustrate the principles of the invention and should not be construed as limiting the scope of the subject matter of the terms of the claimed invention. The specification and drawings are, accordingly, to be regarded in an illustrative rather than a restrictive sense. Moreover, the principles of the invention may be applied to achieve the advantages described herein and to achieve other advantages or to satisfy other objectives, as well.

What is claimed is:

1. A mounting hat for a brake rotor comprising:
    a lower section coupled to an upper section,
    a plurality of aerodynamically shaped standoff vanes each having a leading edge, a trailing edge, a top, and a bottom coupled to the upper section, the aerodynamically shaped standoff vanes space apart the upper section from a brake rotor, wherein the leading edge and the trailing edge are curved and have different shapes; and
    a plurality of vents formed between adjacent aerodynamically shaped standoff vanes, wherein the vents are circumferentially distributed on the upper section, and air located within said mounting hat and air deflected from said brake rotor are induced to substantially flow through the plurality of vents in a direction outward from a radial interior of said mounting hat to a radial exterior of said mounting hat.

2. The mounting hat of claim 1, wherein the leading edge and the trailing edge of the plurality of aerodynamically shaped standoff vanes are one of stepped up and ramped up from the upper section towards the top of the plurality of aerodynamically shaped standoff vanes.

3. The mounting hat of claim 1, wherein the leading edge and the trailing edge of the plurality of aerodynamically shaped standoff vanes are asymmetrical from a center point along each of the leading edge and the trailing edge.

4. The mounting hat of claim 1, wherein the top of the plurality of aerodynamically shaped standoff vanes is bored to accept one of a drive pin, a bolt, and a lug.

5. A brake rotor comprising:
a rotor,
a hub having a plurality of aerodynamically shaped standoff vanes each having a leading edge, a trailing edge, a top, a bottom and a plurality of vents formed between adjacent aerodynamically shaped standoff vanes coupled to the rotor, the leading edge and the trailing edge each having different shapes, wherein the vents are circumferentially distributed between the hub and the rotor, air flow is induced to flow through the plurality of vents, and the aerodynamically shaped standoff vanes space apart the hub from the rotor.

6. The brake rotor of claim 5, wherein the leading edge and the trailing edge of the plurality of aerodynamically shaped standoff vanes are one of stepped up and ramped up towards the top of the plurality of aerodynamically shaped standoff vanes.

7. The brake rotor of claim 5, wherein the leading edge and the trailing edge of the plurality of aerodynamically shaped standoff vanes are asymmetrical.

8. The brake rotor of claim 5, wherein the top of the plurality of aerodynamically shaped standoff vanes is bored to accept one of a drive pin, a bolt, and a lug.

\* \* \* \* \*